United States Patent
Robles et al.

(10) Patent No.: US 6,355,925 B1
(45) Date of Patent: Mar. 12, 2002

(54) VECTORIAL PHOTOSENSOR

(75) Inventors: Manuel Ruiz Robles; Manuel Ruiz Sanchez, both of Madrid (ES)

(73) Assignee: Infrarrojo y Microelectronica, S.L., Madrid (ES)

( * ) Notice: Subject to any disclaimer, the term of this patent is extended or adjusted under 35 U.S.C. 154(b) by 0 days.

(21) Appl. No.: 09/254,461

(22) PCT Filed: Sep. 10, 1997

(86) PCT No.: PCT/ES97/00219

§ 371 Date: Mar. 5, 1999

§ 102(e) Date: Mar. 5, 1999

(87) PCT Pub. No.: WO98/11450

PCT Pub. Date: Mar. 19, 1998

(30) Foreign Application Priority Data

Sep. 13, 1996 (ES) ................................. 9601946

(51) Int. Cl.[7] .......................... H01J 40/14; G01B 11/03
(52) U.S. Cl. .................................. 250/214 R; 250/206.1
(58) Field of Search ........................ 250/214 R, 206.1, 250/206.2; 356/141.5

(56) References Cited

U.S. PATENT DOCUMENTS 4,611,914 A * 9/1986 Homma .................... 356/141.5
5,072,105 A * 12/1991 Osawa ..................... 250/206.1
5,187,540 A    2/1993 Morrison
5,367,315 A   11/1994 Pan

FOREIGN PATENT DOCUMENTS

| EP | 0678946 A1 | 10/1995 |
| FR | 2447017 | 8/1980 |
| GB | 2284478 A | 6/1995 |
| WO | WO 95/19577 A | 7/1995 |

* cited by examiner

Primary Examiner—F. L Evans
(74) Attorney, Agent, or Firm—Ladas & Parry

(57) ABSTRACT

System intended to determine the orientation in the space of a body integral with a photoreceiver, comprised of three photosensors (3) which receive light from a photoemitter (1), which provides through an electronic calculation subsystem to determine the direction (5) of the incident radiation (2). The integration of the photosensors into a CMOS circuit is one form of execution of a photosensor surface having a vectorial character and capable of determining the intensity and direction of the radiation arriving from the photoemifter. Its object is to access information and control systems by using the movement of the user's head. The vectorial photosensor senses the movements of the body and uses said information to establish the position of the pointer and execute actions in information and control systems. Other alternatives of the system make it possible to determine the position and orientation, in elevation and azimuth, of a body in the space.

4 Claims, 2 Drawing Sheets

VECTORIAL PHOTOSENSOR

OBJECT OF THE INVENTION

This specification refers to an invention patent concerning a sensor for the automatic and accurate determination, through a rigorous procedure, of the vector that defines the incident energy flux density, under different forms—for example, optical or thermal—originated from any direction in the space.

FIELD OF THE INVENTION

This invention is related to sector of intelligent sensors.

Its field of application is in intelligent interfaces for information systems, robotics, industrial automation, man-machine interfaces, as well as in the real pointing devices, of great interest in the area of disable and elderly people—tetraplegics, blinds . . . —being able to be integrated on input devices, for example free-hands mouse.

A further field of application is in automatic systems for the patients study with mobility difficulties, for example in the automatic record and analysis of their movements, as well as the field of the rehabilitation of this type of patients: paraplegics, tetraplegics, persons with arthritis, multiple sclerosis, cerebral paralysis.

Another field of application is that of input devices for virtual reality system.

BACKGROUND OF THE INVENTION

There are well known systems that use the directional character of the phenomenon of energy radiation through waves, for example luminous radiation or infrared radiation, to build devices that permit, in a way more or less rudimentary, the determination of the direction of the device with respect to the arrival direction of the energy.

The systems known do not constitute concepts that permit to change, in a rigorous manner, the set of the possible values of the incident radiation in other set of electrical signals that express accurately the intensity and arrival direction of the radiation. That is to say that the intensity and direction information that is intended to know is degenerated by the own concept in the sensing process.

The document patent WO 9519577 A, published on the Jul. 20, 1995 describe a method for monitoring the position of an article in space. It permits to obtain a relative precision, as indicated in the cited document, but it is not a rigorous and accurate method for many applications.

There are also other methods related in the patent documents: U.S. Pat. No. 5,367,315 A, published the Nov. 22, 1994; U.S. Pat. No. 5,187,540 A, published the Feb. 16, 1993; FR 2447017 A, published Aug. 14, 1980 and GB 2284478 A, published Jun. 7, 1995. None of this describes a method that permit, in a practical and rigorous way, to realise the object of the vectorial photosensor: to measure in an accurately way the intensity and arrival direction of an optical radiation originated from any direction in the space.

The documents cited as description of the background art, even though solve concrete problems, they do not give a solution to the problem of the rigorous determination of the intensity and arrival direction of a radiation originating from any direction in the space. The solution to this problem, especially in the region of the corresponding electromagnetic spectrum to the near infrared and thermal infrared, is of great interest by the big number of applications that are derived.

DESCRIPTION OF THE INVENTION

This invention constitutes a specific concept that permits to measure accurately the intensity and direction of arrival of an incident energy to the sensor, through a rigorous and automatic procedure.

This sensor, implemented through an undefined number of sensitive means placed not parallel in the space, e.g. on polyhedric surfaces, has a lot of new characteristics in comparison with the sensor systems, known. We have designated it as vectorial photosensor because it permits the transformation of the incident energy, through an appropriate electronic means, in a set of electrical signals that represent, rigorously and accurately, the intensity and direction of the incident energy.

This invention provides a great flexibility in the number and distribution of the sensitive means to the incident energy, permitting to configure any polyhedric surface, constituted by three or more sensitive means, as the input device of the vectorial photosensor.

It is based in the determination of the direction and intensity of the incident energy by means of the measurement of the optical signals received by a set of sensitive means, that transform the incident energy into electrical signals. These sensitive means are located in the space building a polyhedric surface, which incorporates from three up to an undefined number of sensitive means.

The electrical output of the sensitive means, are acquired through an electronic means that transforms the electrical output signals of these sensitive means, that is to say the sensitive facets of the polyhedric surface. The. electronic means also process the acquired outputs signals through a specific algorithm that permits to obtain the components of the vector that characterise the flow density of the incident energy.

The incident energy flux is transformed by the sensitive elements into proportional electrical signals to the energy flux density, to the cosine of the incidence angle, to the effective surface and as well as to the responsivity of each sensitive means.

We designate p to a vector whose module represents the value of the energy flux density, being its direction and sense the same that the propagation of the radiation. We introduced also a new concept, which we designate vectorial responsivity, being its module the product of the responsivity of one of the sensitive means by its sensitive surface and its direction the perpendicular to such surface, being incoming by the sensitive face.

The electrical output of each sensitive means, designated $s_i$, can be expressed as the scalar product of the vectorial responsivity $e_i$ and the vector p that represents the energy flux density:

$$s_i = e_i \cdot p$$

This invention may incorporate from three up to an undefined number N of sensitive means, located each one of them on each one of the faces of a polyhedric surface, constituting the transducer of the vectorial photosensor.

For three sensitive means the electrical output signals are:

$$s_1 = e_1 \cdot p \quad s_2 = e_2 \cdot p \quad s_3 = e_3 \cdot p$$

Considering an orthogonal base OXYZ, we represent the vectorial responsivities in function of its components with respect to the base as:

$$e_1 = \begin{bmatrix} e_{1x} \\ e_{1y} \\ e_{1z} \end{bmatrix} \quad e_2 = \begin{bmatrix} e_{2x} \\ e_{2y} \\ e_{2z} \end{bmatrix} \quad e_3 = \begin{bmatrix} e_{3x} \\ e_{3y} \\ e_{3z} \end{bmatrix}$$

In an analogous way we represent the energy flux density in function of its components with respect to the base as:

$$p = \begin{bmatrix} p_x \\ p_y \\ p_z \end{bmatrix}$$

In this way we represent the signals generated by the sensitive means as:

$$s_i = \begin{bmatrix} e_{ix} \\ e_{iy} \\ e_{iz} \end{bmatrix}^t \cdot \begin{bmatrix} p_x \\ p_y \\ p_z \end{bmatrix}$$

that is to say:

$$s_i = \begin{bmatrix} e_{ix} & e_{iy} & e_{iz} \end{bmatrix} \cdot \begin{bmatrix} p_x \\ p_y \\ p_z \end{bmatrix}$$

The equation that describes the physical implementation of this invention is:

$$\begin{bmatrix} s_1 \\ s_2 \\ s_3 \end{bmatrix} = \begin{bmatrix} e_{1x} & e_{1y} & e_{1z} \\ e_{2x} & e_{2y} & e_{2z} \\ e_{3x} & e_{3y} & e_{3z} \end{bmatrix} \cdot \begin{bmatrix} p_x \\ p_y \\ p_z \end{bmatrix}$$

that is to say:

$$[s_i] = [e_{ij}] \cdot [p_j]$$

The matrix, whose rows represent the vectorial responsivities of the photosensing polyhedric structure built by the sensitive means, constitutes a new concept which we designate vectorial responsivity matrix.

The vectorial responsivity matrix characterizes the electrical response of the polyhedric surface to the incident energy, and constitutes the transducer of the invention: the vectorial photosensor.

The determination of the components of the vector p, that defines the incident energy flux density, is obtained through the implementation of a specific algorithm that process—by an appropriate electronic means—the electrical output signals of the sensitive means of the polyhedric surface.

Once the values of the signals generated by the polyhedric surface are acquired through an appropriate electronic means, and knowing the vectorial responsivity matrix, whose elements are stocked in the memory of the electronic means, is obtained the vector that represents the energy flux density through the specific algorithm implemented by the electronic means.

Many mathematical methods get to obtain the vector p from the above equation that describes physically the implementation of the vectorial photosensor and constitute a fundamental characteristic of this invention.

The elements of the vectorial responsivity matrix are characteristic parameters of the vectorial photosensor. The value of these elements depends of the characteristics of the sensitive means and of its place in the space, that is to say depends of the responsivities of the sensitive means and of the geometric form of the polyhedric surface implemented.

A way to obtain the vector p from the vectorial photosensor equation is by implementing the algorithm:

$$[p_j] = [e_{ij}]^{-1} \cdot [s_j]$$

The value of the module of the vector p represents the value of the energy flux density from a source at the plyhedric surface and, consequently, it is possible to calculate the distance to the source when the radiant intensity is known and the atmospheric absorption is small.

If the sensitive means are placed in the space in an orthogonal way, we establish, an orthonormal base OXYZ, with its axes perpendicular to the active surface of each photosensor.

The electrical signals to the output of each photosensor, that we will designate $s_i$ are the following scalar products:

$$s_x = e_x \cdot p \quad s_y = e_y \cdot p \quad s_z = e_z \cdot p$$

that is to say:

$$s_x = e_x p \cos \alpha \quad s_y = e_y p \cos \beta \quad s_z = e_z p \cos \gamma$$

Dividing each signal by the mode of the vectoal responsivity of each photosensor we have the normalised signals:

$$s'_x = s_x / e_x = p \cos \alpha$$

$$s'_y = s_y / e_y = p \cos \beta$$

$$s'_z = s_z / e_z = p \cos \gamma$$

The unitary vector u—that it defines the arrival direction of the emission with respect to the reference system—is determined by a expression that depends of the normalised signals, and it is invariant respect to the value of the radiation and consequently invariant also with respect to the distance to the emitter. The unitary vector is:

$$u = \cos \alpha i + \cos \beta j + \cos \gamma k$$

$$\cos \alpha = s'_x/p \quad \cos \beta = s'_y/p \quad \cos \gamma = s'_z/p$$

it permits to write:

$$(s'_x/p)^2 + (s'_y/p)^2 + (s'_z/p)^2 = \cos^2\alpha + \cos^2\beta + \cos^2\gamma = 1$$

that is to say:

$$p = (s'^2_x + s'^2_y + s'^2_z)^{+\text{thu } 1/2}$$

determining the unitary vector, that defines the direction of the radiation, by the expression:

$$u = (s'_x/(s'^2_x + s'^2_y + s'^2_z)^{1/2})i + (s'_y/(s'^2_x + s'^2_y + s'^2_z)^{1/2})j + (s'_z/(s'^2_x + s'^2_y + s'^2_z)^{1/2})k$$

The vectorial photosensor, in one of its applications, includes a energy radiating means, firm to a reference system O'X'Y'Z' fixed in the space, that illuminates at least three of the sensitive means, fixed to other reference system OXYZ, whose origin O is fixed in the space. This application permits to obtain accurately the orentation of the sensitive means in the space, that is to say the orientation of the system OXYZ.

The vectorial photosensor includes, in one of its applications, an electronic means of pulsated energy emissions. The acquisition of electrical output signals of each one of the sensitive means is synchronized with this pulsated emission.

DESCRIPTION OF THE DRAWINGS

To complete this description and in order to help in providing a better understanding of the characteristics of the invention, two drawing sheets are attached to this specification, being an integral part thereof, wherein the following is displayed with an illustrative, non-limiting character:

The FIG. 1 shows a lighting diode (1) that emits IR radiation (2) and illuminates a polyhedric surface (3), constituted by photodiodes. Each photodiode constitutes a facet of the polyhedric surface, a orthogonal system of reference OXYZ (4), being p the vector (5) that expresses the energy flux density on the polyhedric surface (3) of the IR radiation (2) with respect to the orthogonal system of reference OXYZ (4), being e1, e2, e3 the vectors that represent the vectorial responsivity (6) of the photodiodes that constitute the polyhedric surface (3).

Figure 2:
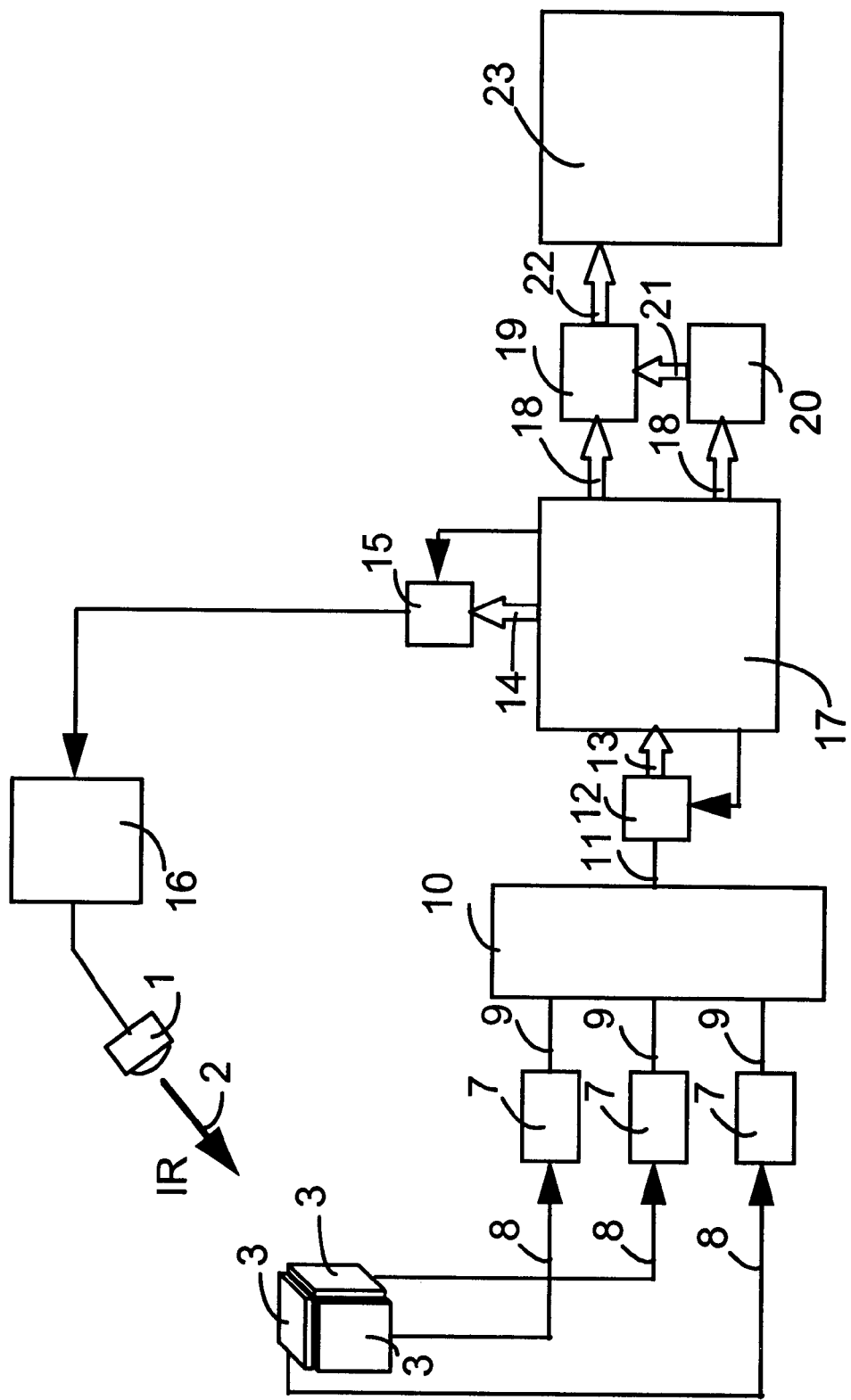

The FIG. 2 shows the polyhedric surface (3) constituted by photodiodes, the unit of signal conditioning (8) that amplifies and filters the electrical output signals (7) of the photodiodes; an multiplexer (10) switchs the amplified and filtered electrical output signals (9), sending each switched signal (11) to a A/D converter (12) that transforms these analog signals (11) into numerical signals (13). These signals are read and processed by the electronic means (17) supplying to the out put of the system (18) the components of the vector that expresses the energy flux density, that is to say the intensity and direction information of the incident radiation (2) for its utilisation, and generating a digital signal (14) of modulation that is transformed into an analog signal by the D/A converter (15) and is conditioned by the modulator (16) that excites the emission of the lighting diode (1).

PREFERRED EMBODIMENT OF THE INVENTION

In the light of these figures, the vectorial photosensor is seen to be shaped on the basis of a form of putting into practice the concept described herein.

Figure 1:
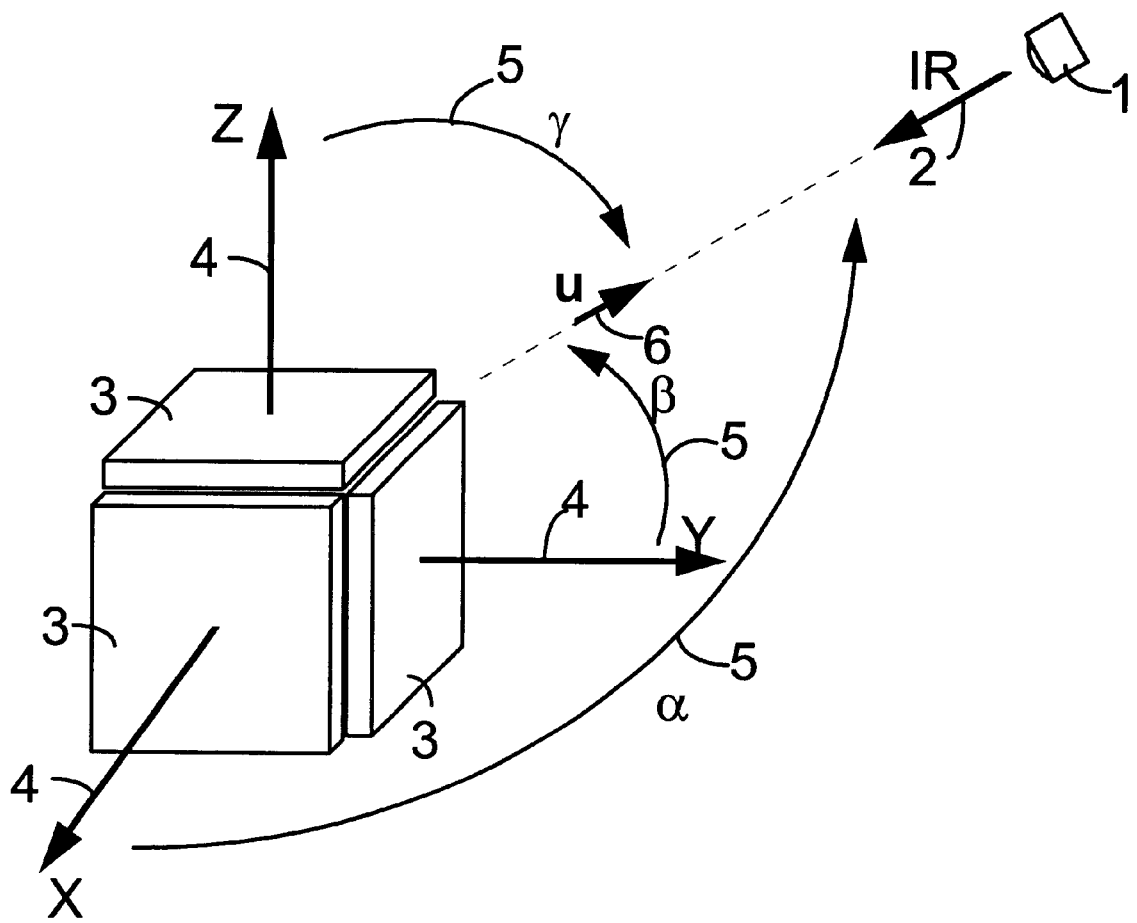

FIG. 1 shows a photoemitter constituted by a lighting diode (1) that illuminates through an IR radiation emission (2) the faces of a polyhedric surface (3). The arrival direction of the IR radiation on the surface of the polyhedric surface (3) is defined by the vector p (5) that expresses the energy flux density of the IR radiation. The polyhedric surface (3), whose faces are constituted by photodiodes with vectorial responsivity e1, e2, e3 (6), is fixed to the orthogonal system of reference OXYZ (4).

FIG. 2 shows the vector p (5), that represents the IR energy flux density (2) originated in the lighting diode (1), illuminates the photodiodes of the polyhedric surface (3) with a radiation whose direction is defined by the vector p (5) being the optical power received by each photodiode proportional to the lighted surface, to the cosine of the incidence angle of the radiation on the lighted surface and to the module of the energy flux density p (5). The values of the electrical signals (7) supplied by the photodiodes, that constitute the polyhedric surface (3), are amplified and filtered by the unit (8) of signal conditioning, whose output (9) is switched by the analog multiplexer (10), whose output signal (11) is transformed into numerical through a A/D converter (12) whose output (13) is read by the electronic means (17). The electronic means (17) process this signals through the equation that defines the physical implementation of the system:

$$\begin{bmatrix} s_1 \\ s_2 \\ s_3 \end{bmatrix} = \begin{bmatrix} e_{1x} & e_{1y} & e_{1z} \\ e_{2x} & e_{2y} & e_{2z} \\ e_{3x} & e_{3y} & e_{3z} \end{bmatrix} \cdot \begin{bmatrix} p_x \\ p_y \\ p_z \end{bmatrix}$$

It permits to obtain the values of the energy flux density by $[p_j]=[e_{ij}]^{-1} \cdot [s_i]$, that is to say the direction of the incident radiation represented by the vector p. This vector is obtained if at least three sensitive means not parallel of the polyhedric surface (3) are illuminated.

SUMMARY

A vectorial photosensor that permit the accurate measurement of the incident energy flux density incident (5), in module as well as in direction. It senses the infrared energy (2) originated from an infrared emitter (1). It is constituted by sensitive means placed on a polyhedric surface (3) that can contain an undefined number of facets, and an electronic means of signal processing (17). The infrared emitter (1) illuminates at least three of the sensitive means of the facets of the polyhedric surface (3), transforming the energy received into electrical signals (7) that is processed through a specific algorithm implemented by the electronic means (17) that obtains the components of the vector that expresses the energy flux density (5). This invention has its field of application in smart man-machine interfaces for information systems, control and automation.

What is claimed is:

1. A vectorial photosensor comprising three or more photosensitive means, placed on respectively different surfaces of a polyhedron, that transform incident energy into electrical signals, and electronic means which acquire and process the electrical signals originated in the sensing means to obtain the direction of the incident energy, characterized in that its electronic means acquires and process the electrical signals originated at least in three sensitive means, placed not parallel in space, and obtains the vector p, which expresses the energy flux density of the incident energy, through the equation $$\begin{bmatrix} s_1 \\ s_2 \\ s_3 \end{bmatrix} = \begin{bmatrix} e_{1x} & e_{1y} & e_{1z} \\ e_{2x} & e_{2y} & e_{2z} \\ e_{3x} & e_{3y} & e_{3z} \end{bmatrix} \cdot \begin{bmatrix} p_x \\ p_y \\ p_z \end{bmatrix}$$

where:

$s_1$, $s_2$, $s_3$ are the signals generated by three sensitive means;

$e_{1x}$, $e_{1y}$, $e_{1z}$, ..., $e_{3x}$, $e_{3y}$, $e_{3z}$ are the components of the vectorial responsivities of, respectively, each one of this sensitive means, that constitute elements of the vectorial responsivity matrix; and $P_x$, $p_y$, $p_z$ are the components of the vector p that expresses the energy flux density of the incident energy.

2. Vectorial photosensor, according to claim 1, characterized in that the electronic means process the electrical output signals of the sensitive means implementing the algorithm $$[p_j]=[e_{ij}]^{-1} \cdot [s_i]$$

to obtain the vector $[p_j]$, that represents the vector that describes the intensity and direction of the incident energy; $[e_{ij}]$ the vectorial responsivity matrix of the set of sensitive means and $[s_i]$ the electrical output signals of the set of sensitive means.

3. Vectorial photosensor, according to claim 1, characterized in that it includes a photoemitter, the acquisition of the electrical output signals of the sensitive means being synchronized with the energy emission of said photoemitter.

4. Vectorial photosensor, according to claim 1, characterized in that the electronic means process the electrical output signals of the sensitive means, when they are placed on respectively different orthogonal planes in the space, to obtain the unitary vector u that expresses the direction of the vector p, implementing the simplified algorithm $$u = (S'_1/(S'^2_1 + S'^2_2 + S'^2_3)^{1/2})i + (S'_2/(S'^2_1 + S'^2_2 + S'^2_3)^{1/2})j + (S'_3/(S'^2_1 + S'^2_2 + S'^2_3)^{1/2})k$$

being:

- u the unitary vector that expresses the direction of the vector p, that expresses the energy flux density of the incident energy, respect the orthonormal base OXYZ, with axes respectively normal to the sensitive means
- $S'_1 = S_1/e_1$; $S'_2 = S_2/e_2$; $S'_3 = S_3/e_3$ the normalized signals, obtained dividing each signal by the module of the vectorial responsivity of each sensitive mean $e_1$, $e_2$, $e_3$ the modules of, respectively, the vectorial responsivities $e_1$, $e_2$, $e_3$.

* * * * *